United States Patent
Greenfield et al.

(10) Patent No.: US 7,827,481 B1
(45) Date of Patent: Nov. 2, 2010

(54) DEFINING STYLE VALUES AS OBJECTS

(75) Inventors: Eliot Greenfield, Oakland, CA (US); David George, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1120 days.

(21) Appl. No.: 11/189,094

(22) Filed: Jul. 25, 2005

(51) Int. Cl.
G06F 17/00 (2006.01)

(52) U.S. Cl. .................................................. 715/236

(58) Field of Classification Search .................. 715/235, 715/236, 237
See application file for complete search history.

(56) References Cited

U.S. PATENT DOCUMENTS

| | | | | |
|---|---|---|---|---|
| 5,487,141 | A * | 1/1996 | Cain et al. | 715/764 |
| 6,081,665 | A * | 6/2000 | Nilsen et al. | 717/116 |
| 6,158,048 | A * | 12/2000 | Lueh et al. | 717/118 |
| 6,300,950 | B1 * | 10/2001 | Clark et al. | 715/705 |
| 7,149,694 | B1 * | 12/2006 | Harb et al. | 704/270.1 |
| 2003/0048302 | A1 * | 3/2003 | Quan, Jr. | 345/764 |
| 2003/0226111 | A1 * | 12/2003 | Wirts et al. | 715/514 |
| 2003/0233620 | A1 * | 12/2003 | Vedullapalli et al. | 715/522 |
| 2004/0117776 | A1 * | 6/2004 | Pazandak | 717/143 |
| 2005/0091584 | A1 * | 4/2005 | Bogdan et al. | 715/514 |
| 2005/0108732 | A1 * | 5/2005 | Musson et al. | 719/328 |
| 2005/0228826 | A1 * | 10/2005 | Beran et al. | 707/104.1 |
| 2006/0010374 | A1 * | 1/2006 | Corrington et al. | 715/517 |
| 2006/0082592 | A1 * | 4/2006 | Black-Ziegelbein et al. | 345/605 |
| 2007/0088554 | A1 * | 4/2007 | Harb et al. | 704/257 |
| 2007/0135945 | A1 * | 6/2007 | Glenn | 700/83 |
| 2008/0016501 | A1 * | 1/2008 | Muhlestein et al. | 717/136 |

OTHER PUBLICATIONS

Castro, XML for the World Wide Web, Peachpit Press 2001, pp. 177-180.*
Vetter et al., Linear Object Classes and Image Synthesis from a Single Exmaple Image, IEEE 1997, pp. 733-742.*
Nabong, StyleSheet Translations of SVG to VML, Google 2004, pp. 1-115.*
Jamil et al., An Object-Oriented Extension of XML for Autonomous Web Applications, ACM 2002, pp. 161-167.*
Haustein et al. A Model-driven Runtime Environment for Web Application, Google 2005, pp. 443-458.*
McFarlane, N., "A Standard-Based Look at XAML's Features," www.devx.com/webdev/Article/20834, 6 pgs.
Thomas, K., "Learning How to Code SVG: Scalable Vector Graphics (Part 2)," www.webdeveloper.com/design, 3 pgs.

* cited by examiner

*Primary Examiner*—Cong-Lac Huynh
(74) *Attorney, Agent, or Firm*—Kilpatrick Stockton LLP

(57) ABSTRACT

A method, system, and computer program product for presenting a User Interface (UI), the method includes receiving input defining a value of a presentation property of a UI object as a name of a class declaration, and producing code that when executed, instantiates an object based on the class declaration, the execution of the code applying the object as a style of the UI object.

19 Claims, 2 Drawing Sheets

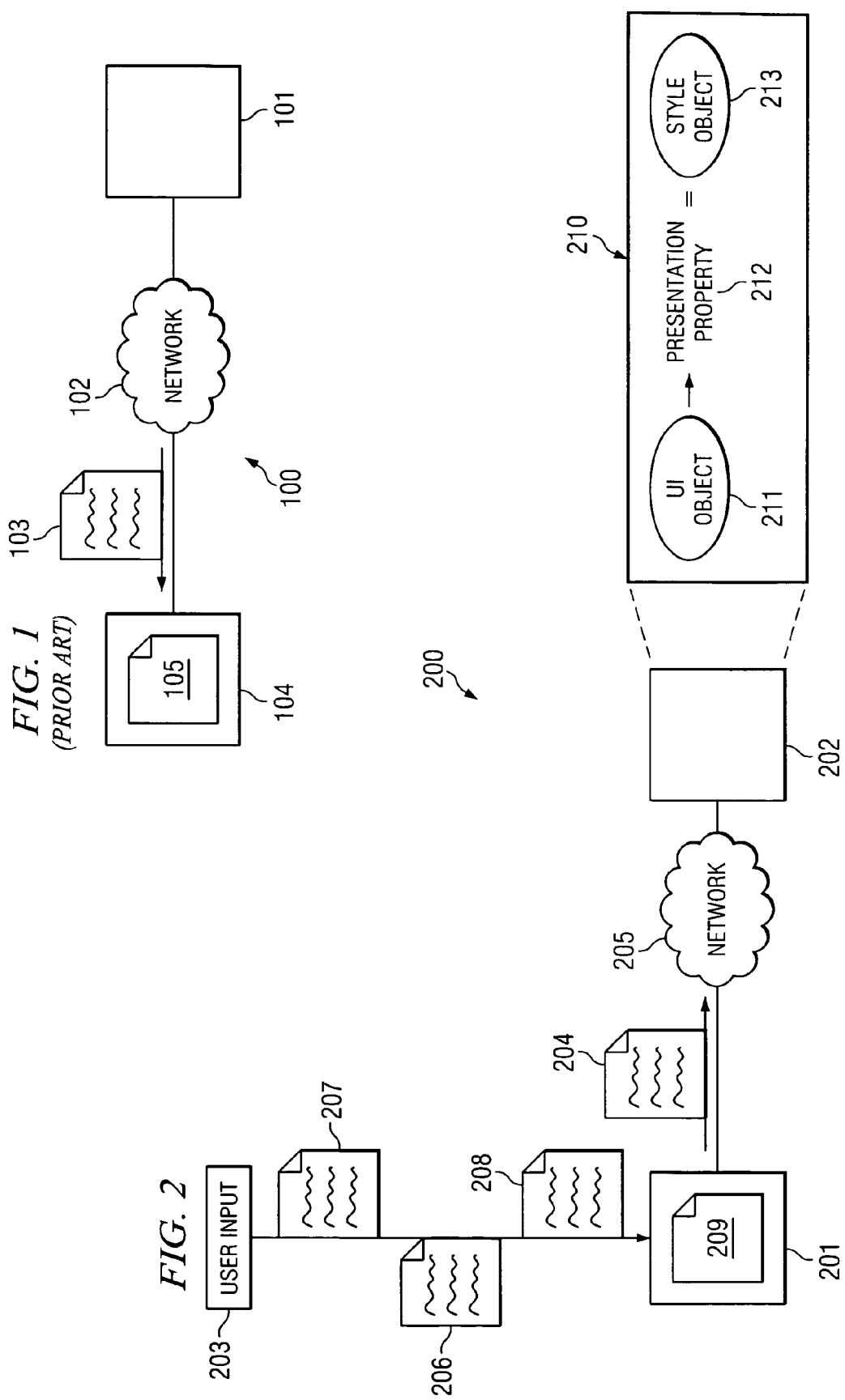

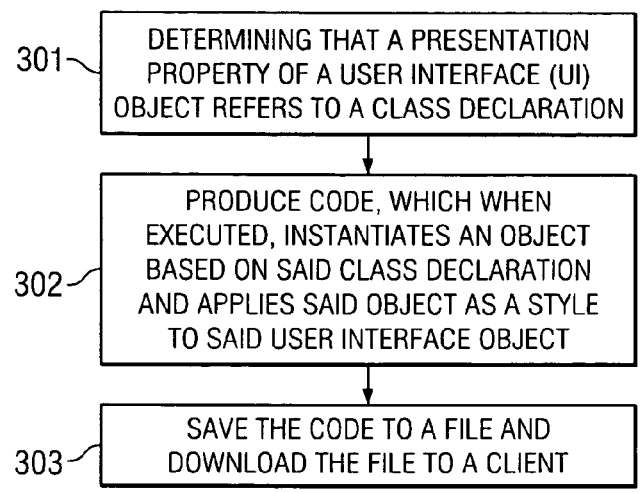
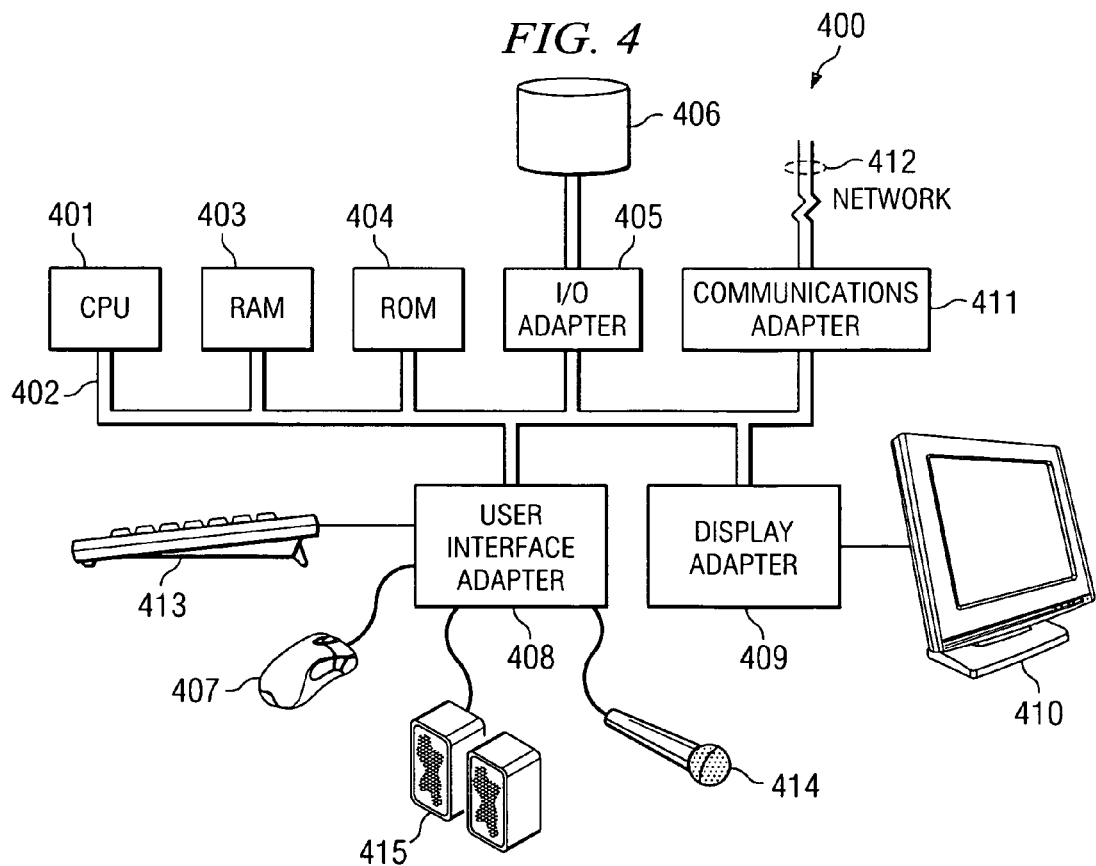

DEFINING STYLE VALUES AS OBJECTS

TECHNICAL FIELD

The present invention relates to applying styles to User Interface (UI) objects, and more specifically, to defining values of style properties.

BACKGROUND OF THE INVENTION

A variety of programs on the market allow a developer (e.g., a web developer) to create web pages, websites, interactive applications, and the like for use by end users (e.g., visitors to websites). Examples of such programs include DREAMWEAVER™ and FLEX BUILDER™, each available from MACROMEDIA INC. of San Francisco, Calif. DREAMWEAVER™ is an Integrated Development Environment (IDE) for creating Hypertext Markup Language (HTML) websites. Examples of other HTML IDEs include GOLIVE®, available from Adobe Systems Incorporated, and FRONTPAGE™, available from Microsoft Corporation. FLEX BUILDER™ is an IDE for creating Rich Internet Applications (RIAs), which are interactive, multimedia applications, that may run on client-side players, for example, MACROMEDIA INC.'s FLASH™ player. FLEX BUILDER™ uses MXML™ as its native development code for RIAs. MXML™ is an Extensible Markup Language (XML)-based language commonly used to create RIAs. MXML™ code looks similar in some ways to HTML. For example, MXML™ uses many tags in common with HTML. A developer may write code in a text editor or FLEX BUILDER™ and save the MXML™ file to the FLEX™ server, which is a presentation level server for RIAs. The FLEX™ server includes a compiler that compiles the code into a file, such as a Small Web Format (SWF) file, that can be downloaded and executed on a user's machine. SWF is the native file format for the FLASH™ player.

FIG. 1 is an illustration of example system 100, adapted to provide a RIA to an Internet user. System 100 uses MACROMEDIA's FLEX™ server and FLASH™ player. System 100 includes server 101 with compiler functionality, network 102 (e.g., the Internet), downloaded file 103, and user computer 104 with FLASH™-enabled web browser client program 105. A developer builds a RIA that includes a UI and saves it in an MXML™ file on server 101. When a user at computer 104 requests the RIA, server 101 accesses the MXML™ file and compiles it into SWF (commonly pronounced "swiff") file 103. SWF file 103 contains, among other things, bytecodes. SWF file 103 is downloaded by browser 105 over network 102 for display to the user. While system 102 uses a FLEX™ server and FLASH™ player, other systems may use different software and file formats while operating similarly, such as systems that employ Microsoft Corporation software or Real Networks software.

The FLEX™ server provides a way to generate SWF file 103 through use of the compiler. As explained above, a developer may open FLEX BUILDER™ or a text editor, create a document with MXML™ tags, and save the file as an MXML™ file to server 101, which is a the FLEX™ server with a compiler. After the compiler compiles the saved code into SWF file 103, the application may then be run on, for example, web browser 105 that is enabled with a FLASH™ player plug-in.

FLASH™-based applications are known for interactive graphics and animation, and the appearance of the graphics is due, in large part, to styles applied to the UI objects. In a typical FLEX BUILDER™ development scenario, a developer creates the graphics from pre-built vector graphic components. Then, the developer applies styles to control how the graphics appear.

Cascading Style Sheets (CSS) is a language that was created specifically for use in HTML web pages to apply styles to visual objects. CSS was developed in an attempt to separate presentation formatting from structure formatting and content. In a general sense, styles usually affect the visual appearance of an object, and include, for example, color and font size, whereas structure formatting usually specifies the objects and arrangement thereof on a user's screen. Just as HTML web pages utilize CSS, applications created with MXML™ also make use of CSS to apply style formatting.

CSS helps to separate structure from presentation in HTML and MXML™ documents. A simple example in HTML begins with a paragraph tag, (<p>, a "P tag"). The purpose of a paragraph tag is to specify a paragraph of content. For example, a developer will place a P tag before text content and end the text content with an end P tag (</p>). The result is that the text appears as a paragraph somewhere on the UI. Creating a paragraph is an example of structure formatting. The appearance of the paragraph is presentation format.

The earliest web applications attached appearance right to the paragraph tag or to other tags embedded within the paragraph, to specify, for example, font, font size, font color, and the like. Additionally, a style can be applied to a tag near the root of a document so that it applies to all of the children of that tag; however, such a style can be explicitly overridden in an individual tag. In MXML™, other tags may exist, such as data grids, buttons, panels, date choosers, and the like, and the rules are substantially the same when applying styles through CSS.

A problem that often arises with such an approach is that the presentation formatting is intermixed with the content or structure. If an artist desires to change the appearance of the text, the artist must interact with the content directly. In the industry, the people who design the structure and the people who update the appearance are usually separate individuals or groups, and it is often convenient to keep those two parts of the application document separate. Thus, instead of specifying the appearance of a UI object directly in the content, it may be desirable to separate presentation formatting into styles in a separate CSS style sheet. Later web applications utilize separate CSS style sheet files to specify the appearance. In other words, there is an independent style sheet file, a CSS file, that specifies the applicable styles. In fact, a given style sheet file can also be applied to several different HTML or MXML™ documents.

Regarding styles themselves, any given style is a name of a property and a value, i.e., a property-value pair. For example, a name of a property may be font family, the value may be Arial or Geneva. Another example of a property name might be background-color and the value might be red. Currently, the available values for the style properties are scalars.

A limitation of CSS, whether in the context of RIAs or HTML web pages, is that it only accepts scalars or simple arrays of integers and strings as values of styles. It is often very difficult if not impossible to apply a presentation style that has any arbitrary amount of complexity. For example, a linear gradient that changes color from one side of the screen to another is much harder to apply than simply specifying that background color is blue. Currently, a linear gradient is not easily expressible as a string because it has a number of values to be grouped together. A developer would have to express the desired appearance using a string, and the string would be very unwieldy. When style properties are limited to strings and integers, it is very difficult not only to express a linear gradient, but also complex polygonal shapes, bit map representations, and the like. At this point, scalar values cease to be expressive enough to describe these complex types of appearances.

BRIEF SUMMARY OF THE INVENTION

The present invention is directed to a system and method that allow a developer to define the value of a CSS property as an object. The object can be an arbitrarily complex object, such that the object itself has a number of subcomponents to specify presentation qualities. Accordingly, developers are not limited to scalar quantities to define styles, such as background color, font, font size, and the like.

In an example, a developer using CSS specifies a value of a property as a class declaration name, the class declaration describing the object. Elsewhere in the application, there is code that includes that class declaration. For instance, the class declaration may be created by a user or included in a library of class declarations. A compiler recognizes that the specified value is a class declaration name, and it produces code that, when executed, instantiates the object and applies it to its associated UI object(s) as a style.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is an illustration of an example system adapted to provide a RIA to an Internet user;

FIG. 2 is an illustration of an exemplary system adapted according to one embodiment of the invention;

FIG. 3 is a flowchart of an exemplary method that may be performed by a server adapted according to one embodiment of the invention;

FIG. 4 illustrates an example computer system adapted according to one embodiment of the invention.

DETAILED DESCRIPTION OF THE INVENTION

FIG. 2 is an illustration of exemplary system 200, adapted according to one embodiment of the invention. System 200 includes presentation layer server 201, which is a FLEX™ server that includes a compiler in this embodiment. Server 201 receives user input 203, such as MXML™ files and CSS files that define a RIA at an end user's computer. User input 203 describes an application, and the application is made up of three pieces—styles, tags, and class declarations. The tags are contained in the MXML™ code, and the styles are contained in CSS code, either in an MXML™ file or in one or more separate files. Further, class declarations are included in the MXML™ file. Alternatively, class declarations may be included in a library of class declarations in server 201. Class declarations, in this example, are written in the form of ACTIONSCRIPT™ code, available from MACROMEDIA, INC. User input 203 includes MXML™ file 206, ACTIONSCRIPT™ file 207, and CSS file 208.

Server 201 includes a compiler that compiles the code it receives from the user into SWF file 204. Server 201 downloads SWF file 204 over network 205 to client program 202. Client program 202, in this embodiment, is a FLASH™-enabled web browser or FLASH™ client running on a user computer (not shown). The FLASH™ instance running on client program 202 executes code in file 204 to produce runtime representation 210 of the application.

As explained above, server 201 includes a compiler to create SWF file 204 out of the code that is entered by the developer. The compiler of server 201 is modified to recognize style values that represent objects, wherein the objects may include a number of subcomponents that each specify a presentation quality. Therefore, a developer can now use complex objects or arbitrary objects in addition to the regular scalar values in CSS styles. Accordingly, runtime representation 210 of the application includes UI object 211, which has presentation property 212 associated with it. Style object 213 is the value of presentation property 213, thereby illustrating that runtime representation 210 applies style object 213 as a style to UI object 211.

To produce runtime representation 210, various embodiments of the invention use names of object types (or more specifically, names of class declarations, since the code is written before any of the objects are instantiated) as values of style properties. Either in user input 203 or in code provided in server 201, there are class declarations for those object types, the class declarations being code that describes the objects and their methods.

In the case of a linear gradient object, the code is responsible for drawing a gradient onto the screen. In at least one embodiment, the user writes code to create the gradient, and then refers to that new type of gradient by name in the CSS. If, for example, the gradient begins on the left side as red, gradually changes to white at a transition point one-third of its length, and gradually changes to blue at a point two-thirds of its length, the user would code an object that specifies the different colors, the gradual changes, and the transition points as a class declaration. The user could then name the class declaration, "my-red-white-and-blue-gradient." In another example, the user creates a gradient class declaration that receives parameters specifying transition points and colors. In embodiments that allow a user to pass parameters to an object, the compiler is modified to recognize and handle the input parameters in the CSS code. This may be more convenient for the user, since one gradient class declaration may provide the template for various instances of the gradient object used throughout the application with a diversity of appearances provided by different parameters.

In another example, presentation layer server 201 includes library 209 of class declarations from which the user may choose. The library class declarations can accept parameters from the user, as described above, such that the user refers to a linear gradient object, and specifies parameters to be passed to it. The invention is not limited in the way that class declarations may be input or included, and various embodiments may allow users to declare classes, allow users to access a library of class declarations, or both.

FIG. 3 is a flowchart of exemplary method 300, which may be performed by a server that includes a compiler, adapted according to one embodiment of the invention. In step 301, the compiler determines that a presentation property of a UI object refers to a class declaration. Step 301 may be part of a compiling process or part of a separate parsing process, and in one example, the determining is performed after a developer or user signals to the server that the application should be compiled into a SWF file. The presentation property is included in a style sheet, which may be in an MXML™ file or in a separate file.

In this step, the compiler goes through the code in the various text files (i.e., MXML™ and CSS files) and determines if the code is well-formed and valid. For example, the compiler will go through the code and point out any syntax errors and also recognize that various styles may refer to objects as values rather than as simple scalars. The compiler may encounter code, such as the following example CSS code:

```
someStyle {
    background-color: LinearGradient {
            entries:
                            GradientEntry { color: red, position: 0 }
                            GradientEntry { color: white, position: .33 }
                            GradientEntry { color: blue, position: .66 }
                    }
}
```

The compiler recognizes that "linear-gradient" is a class declaration rather than a scalar, in one or more ways. In one example, the compiler recognizes that "linear-gradient" is not a proper CSS property value and searches in either the library or other code for a class declaration of that name. In another example, the user may include a path name or URL that directs the compiler to a specific location of the class declaration. In yet another example, class declaration names include a text string that explicitly identifies them as such. The invention is not limited in the ways in which the compiler may recognize that a rule refers to an object as a style value.

Step 301 also includes recognizing parameters to be passed to the object when it is instantiated. The values in parentheses are parameters that the developer may supply that direct how the object should appear when it is instantiated. In this example, parameters specify that the gradient will start as red on its left side, transition to white one-third of the way through, and transition to blue beginning at two-thirds of the way across its expanse. The compiler recognizes not only that "linear-gradient" is an object, but also that the values are parameters to be applied to the linear gradient object. The parameters are passed in the next step.

In step 302, the compiler produces code, which, when executed, instantiates an object based on the class declaration and applies the object as a style to the UI object. In the case of a FLEX™ server, the compiler accesses the tags, class declarations, and style sheets and produces bytecodes based thereon that, when executed, allow the client to render the application. When executed in a FLASH™ player, the bytecodes cause the UI object to be instantiated and cause a style object to be instantiated from the class declaration specified in the style sheet. The bytecodes further direct the object to be applied as a style to the UI object. In an example, a UI object is a button with the linear gradient applied as a background color. At runtime, the client executes the code, thereby instantiating the UI object and the style object.

The code produced in step 302 assigns the passed parameter values to the object. Thus, when the code is executed, the style object is instantiated, and its appearance will be determined, at least in part, by the parameters.

In step 303, the code is saved in a file and downloaded to a client. In an embodiment that utilizes a FLEX™ server, bytecodes produced during compiling are saved in a SWF file. The SWF file is then downloaded to a FLASH™ player client, such as a FLASH™-enabled web browser. The client renders the application for a user, and the application includes the UI object with the applied style. For example, the user may see a button on the screen with a background color that is the red, white, and blue linear gradient described above.

While the examples above illustrate a style class declaration used only once in an application, it is possible for the style class declaration to be used more than once per application. Further, a given style sheet may apply to many applications, such that a style object may be applied in a plurality of applications.

Embodiments of the invention can be adapted for use in a variety of Internet applications. For example, applications described in HTML and JAVA™ may benefit from various aspects of the invention if the associated server and/or client includes functionality to recognize class declarations as values of presentation properties. Further, the UI objects above are described in the context of visual presentation; however, the invention is not so limited. For example, various embodiments of the invention may be used to apply styles to audio objects in a UI, such that a given style class declaration may specify audio qualities of a UI object. All presentation properties are within the scope of the various embodiments of the invention.

Further, the examples herein describe the compiler as part of a server; however, the invention is not so limited. In other embodiments of the invention, the server and compiler are not paired.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 4 illustrates example computer system 400 adapted according to embodiments of the present invention. That is, computer system 400 comprises an example system on which embodiments of the present invention may be implemented. Central processing unit (CPU) 401 is coupled to system bus 402. CPU 401 may be any general purpose CPU. However, the present invention is not restricted by the architecture of CPU 401 as long as CPU 401 supports the inventive operations as described herein. CPU 401 may execute the various logical instructions according to embodiments of the present invention. For example, CPU 401 may execute machine-level instructions according to the exemplary operational flows described above in conjunction with FIG. 3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as, for example, entering MXML™, CSS, or ACTIONSCRIPT™ code.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for program 403. Communications adapter 411 is preferably adapted to couple computer system 400 to network 412 (e.g., the Internet). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display a working space or canvas to a developer or display a rendered application to a user.

It shall be appreciated that the present invention is not limited to the architecture of system 400. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for presenting a User Interface (UI), said method comprising:
   receiving input including a style sheet, said style sheet defining a property-value pair, the property of the property-value pair in the style sheet being applicable to a user interface object and the value of the property-value pair being a name of a class declaration, wherein the class declaration refers to code defining a style object that, when instantiated, is usable to draw a visual element, the code defining the style object in the stylesheet being distinct from code that defines elements of the user interface object; and
   producing code that, when executed, instantiates a style object as an instance of the class named in the class declaration and uses the instantiated style object to draw the visual element when rendering the user interface object.

2. The method of claim 1 wherein said input further includes code from one or more of:
   a tag-based language; and
   script language.

3. The method of claim 1 wherein said receiving and said producing are performed on a compiler, and wherein said class declaration is included in a library on a presentation-level server associated with said compiler.

4. The method of claim 3 further comprising downloading said code to a client program operable to execute said code and render said UI.

5. The method of claim 1 wherein said input further includes tag-based code, and wherein said producing code comprises compiling said tag-based code and code from said style sheet into bytecodes.

6. The method of claim 1 wherein receiving input comprises:
   inspecting code in said style sheet; and
   recognizing that said code in said style sheet defines said value of said property as said name of said class declaration.

7. The method set forth in claim 1,
   wherein the class declaration refers to code defining a style object that is usable to draw a gradient when instantiated; and
   wherein producing code comprises producing code that, when executed, instantiates a style object based on said class declaration, said execution of said code applying said style object as a style of said user interface object by drawing the gradient.

8. The method set forth in claim 1,
   wherein the code, when executed, applies said style object as a style of said user interface object by using a method defined by the instantiated style object to draw the visual element while rendering the user interface object.

9. A method for providing a Rich Internet Application, said method comprising:
   parsing a style sheet, said style sheet defining a property-value pair, the property being applicable to a user interface object;
   based on said parsing, determining that the value of the property-value pair names a class declaration, the class declaration referring to code defining a style object that is usable to draw a visual element when instantiated, the code defining the style object being distinct from code that defines elements of the user interface object; and
   producing code that, when executed, instantiates a style object as an instance of the class named in the said class declaration and applies said instantiated style object as a style to said user interface object by using the instantiated style object to define an appearance of the interface object.

10. The method of claim 9 wherein said determining comprises one or more of:
    recognizing that a value of said property is other than a scalar value;

recognizing that a URL points to a file including said class declaration; and recognizing a text string that indicates said class declaration.

11. The method of claim 9 further comprising:

saving said code in a file; and downloading said file to a client operable to execute said code.

12. The method of claim 9 wherein said style sheet is a Cascading Style Sheets (CSS) style sheet.

13. The method of claim 12, further comprising:

receiving user input that describes said user interface object, said property, and said class declaration.

14. The method of claim 13 wherein said user input includes code from the following:

a tag-based language describing a structure of said Rich Internet Application; and a script language describing said user interface object and said class declaration.

15. The method of claim 9 wherein said style object based on said class declaration comprises two or more subcomponents, each subcomponent defining one or more presentation qualities.

16. The method of claim 9 further comprising:

receiving a plurality of parameters in said style sheet, said parameters specifying a quality for use by the style object; and producing code, that when executed, passes said parameters to said style object based on said class declaration.

17. A computer program product comprising a tangible storage device embodying program code, the program code comprising:

code for accepting input defining a user interface object;

code for accepting a style sheet defining a property-value pair, the property of the property-value pair applicable to the user interface object and the value of the property-value pair being a name of a class declaration, the class declaration referring to code defining a style object that, when instantiated, is usable to draw a visual element, the code defining the style object being distinct from code that defines elements of the user interface object; and code for compiling a file, which when executed, instantiates said user interface object and said style object and applies said style object as a style to said user interface object.

18. The computer program product of claim 17 further comprising code for downloading said file to a client operable to execute said file.

19. The computer program product of claim 17 wherein said code for compiling comprises one or more of:

code for recognizing that said value of said property is other than a scalar value;

code for recognizing that a URL points to a file including said class declaration; and code for recognizing a text string that indicates said class declaration.

* * * * *

UNITED STATES PATENT AND TRADEMARK OFFICE
CERTIFICATE OF CORRECTION

| | | |
|---|---|---|
| PATENT NO. | : 7,827,481 B1 | Page 1 of 1 |
| APPLICATION NO. | : 11/189094 | |
| DATED | : November 2, 2010 | |
| INVENTOR(S) | : Greenfield et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,038 days.

Signed and Sealed this
Ninth Day of August, 2011

David J. Kappos
*Director of the United States Patent and Trademark Office*